United States Patent
Agrawal et al.

(10) Patent No.: US 8,495,428 B2
(45) Date of Patent: Jul. 23, 2013

(54) QUALITY OF SERVICE MANAGEMENT OF END USER DEVICES IN AN END USER NETWORK

(75) Inventors: Dakshi Agrawal, Monsey, NY (US); Joel Branch, Hamden, CT (US); Kang-won Lee, Nanuet, NY (US); Petros Zerfos, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/494,824

(22) Filed: Jun. 30, 2009

(65) Prior Publication Data

US 2010/0332906 A1 Dec. 30, 2010

(51) Int. Cl.
*G06F 11/00* (2006.01)
(52) U.S. Cl.
USPC ............................ 714/37; 714/4.1; 714/47.1
(58) Field of Classification Search
USPC .................................. 714/25, 37, 46, 47.1, 48
See application file for complete search history.

(56) References Cited

U.S. PATENT DOCUMENTS

| | | | |
|---|---|---|---|
| 6,301,557 B1 | 10/2001 | Miller et al. | |
| 6,658,586 B1 * | 12/2003 | Levi | 714/4.3 |
| 6,816,719 B1 | 11/2004 | Heinonen et al. | |
| 7,082,460 B2 | 7/2006 | Hansen et al. | |
| 7,197,546 B1 * | 3/2007 | Bagga et al. | 709/223 |
| 7,337,219 B1 | 2/2008 | Meenan et al. | |
| 7,349,993 B2 | 3/2008 | Kawamoto et al. | |
| 7,359,973 B2 | 4/2008 | Chiles et al. | |
| 2002/0184568 A1 * | 12/2002 | Kurrasch | 714/39 |
| 2003/0200477 A1 * | 10/2003 | Ayres | 714/2 |
| 2003/0217125 A1 | 11/2003 | Brancati et al. | |
| 2003/0217306 A1 * | 11/2003 | Harthcock et al. | 714/30 |
| 2004/0010579 A1 | 1/2004 | Freese | |
| 2005/0102406 A1 | 5/2005 | Moon | |
| 2005/0154985 A1 | 7/2005 | Burkhart et al. | |
| 2005/0193257 A1 * | 9/2005 | Stoler | 714/31 |
| 2005/0262383 A1 * | 11/2005 | Sierer et al. | 714/4 |

(Continued)

FOREIGN PATENT DOCUMENTS

| | | |
|---|---|---|
| WO | WO03038542 | 5/2003 |
| WO | WO2007062718 | 6/2007 |
| WO | WO2008010128 | 1/2008 |

OTHER PUBLICATIONS

DSL Forum, Technical Report TR-11, "Applying TR-069 to Remote Management of Home Networking Devices", Dec. 2005, pp. 1-29.

*Primary Examiner* — Sarai Butler
(74) *Attorney, Agent, or Firm* — Preston Young; Ryan, Mason & Lewis, LLP

(57) ABSTRACT

Methods and apparatus for managing quality of service of computing resources are presented. For example, a method implemented on a processor for managing quality of service of computing resources includes identifying, by the processor, one or more devices of a user on a network of the user; obtaining, by the processor, at least one management module for the identified one or more devices; installing the at least one management module in the processor; monitoring, by the processor, the one or more devices of the user for a problem; and determining, by the processor, a domain in which a root cause of the problem resides and, optionally, the root cause of the problem. The management module comprises information pertaining to a corresponding device. Further, the method may detect quality of service (QoS) problems and determine if the problems reside in a user domain or a service provider domain.

24 Claims, 5 Drawing Sheets

U.S. PATENT DOCUMENTS

| | | |
|---|---|---|
| 2006/0018328 A1 | 1/2006 | Mody et al. |
| 2006/0259809 A1* | 11/2006 | Mishra et al. ............... 714/4 |
| 2006/0272014 A1 | 11/2006 | McRae et al. |
| 2007/0025245 A1 | 2/2007 | Porras et al. |
| 2009/0070640 A1* | 3/2009 | Stabile et al. ............... 714/57 |
| 2009/0217082 A1* | 8/2009 | Hatasaki et al. ............... 714/4 |

* cited by examiner

400

QUALITY OF SERVICE MANAGEMENT OF END USER DEVICES IN AN END USER NETWORK

FIELD OF THE INVENTION

The present invention relates generally to management of networks and, more particularly, the invention relates to quality of service management of end user networks and devices attached thereto.

BACKGROUND OF THE INVENTION

Various studies project that the number of end user devices connected to the network will grow rapidly. These end user devices are diverse in functionality (e.g., laptops, personal digital assistants or PDAs, gaming consoles, office printers and scanners, music players, televisions and entertainment systems), have different degrees of ease of configuration, and provide different management interfaces. End user devices typically access the Internet using a residential or a small and medium business (SMB) gateway.

When customers experience a performance problem with a device in their residential or home network, their first instinct is to contact Internet service provider (ISP) for customer support. Each service contact that cannot be self-served by the customer costs the service provider approximately on the average of $25 to $50, degrading profit margins for the service provider. Because of the expense and other service or customer related issues, locating the root cause of performance degradation of end user devices is an important issue for service providers. Root cause of degradation may lie in networks of service providers, in a network of the user, or in misconfigured or otherwise faulty end user devices.

Conventional management of residential or SMB networking devices and enforcement of residential-wide or SMB-wide management policies is typically manual, on a per-device basis and error prone. Current methods for locating the root cause either require manual configuration of end user devices or the gateway, or require that the user provide input to a management server. The end users may find configuration difficult or cumbersome; consequently, the end user may not perform the configuration or may perform the configuration incorrectly. Some methods will work without user input, but these methods require that the end user device implement a particular management standard. Such standards are in their infancy and not widely adopted.

SUMMARY OF THE INVENTION

Principles of the invention provide, for example, methods and apparatus for managing quality of service of computing resources.

For example, in accordance with one embodiment of the invention, a method, implemented on a processor, for managing quality of service of computing resources is provided. The method includes identifying, by the processor, one or more devices of a user on a network of the user; obtaining, by the processor, at least one management module for the identified one or more devices; installing the at least one management module in the processor; monitoring, by the processor, the one or more devices of the user for a problem, and determining, by the processor, a domain in which a root cause of the problem resides and/or the root cause of the problem. The management module comprises information pertaining to a corresponding device.

In accordance with another embodiment of the invention, a system for managing quality of service of computing resources is provided. The system comprises modules for implementing the above method for managing quality of service of computing resources.

In accordance with yet another embodiment of the invention, apparatus for managing quality of service of computing resources is provided. The apparatus includes a memory and a processor coupled to the memory. The apparatus is operative to perform the above method for managing quality of service of computing resources.

In accordance with one more embodiment of the invention, an article of manufacture for managing quality of service of computing resources is provided. The article comprising a computer readable storage medium having one or more programs embodied therewith. The one or more programs, when executed by a computer perform the above method for managing quality of service of computing resources.

Advantageously, the invention, for example, detects quality of service (QoS) problems and determines if the problems reside in a user domain or a service provider domain, provides automatic identification of user devices connected to a user network, provides on-demand downloading and installation of management modules for the identified user devices, determines and reveals, to the user, the domain in which the root cause of a problem resides and/or the root cause of the problem, and eliminates trouble calls to the service provider when the problem is in the user domain.

These and other features, objects and advantages of the present invention will become apparent from the following detailed description of illustrative embodiments thereof, which is to be read in connection with the accompanying drawings.

DETAILED DESCRIPTION OF THE INVENTION

Figure 1:
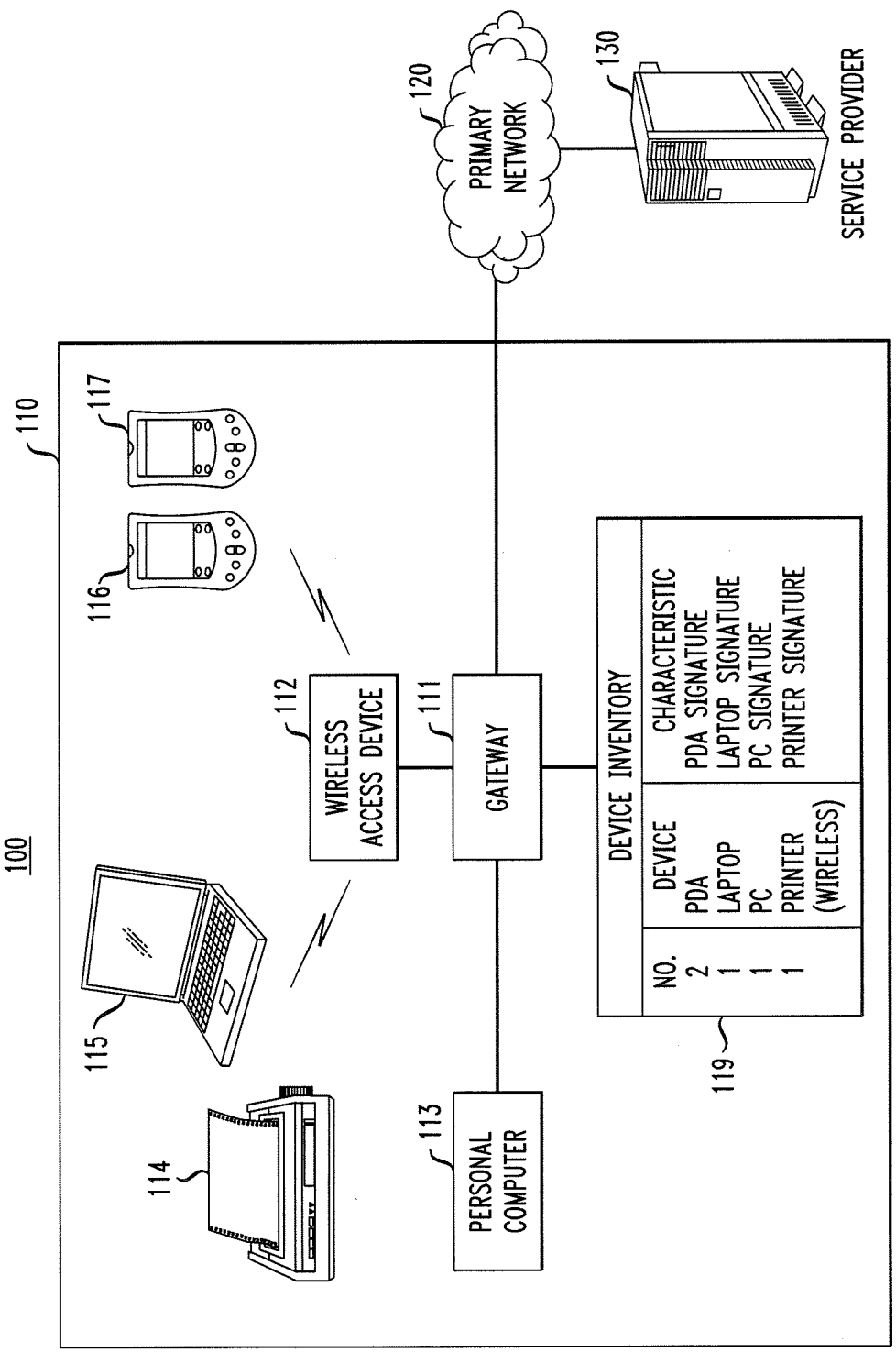
FIG. 1 illustrates a provider to user network comprising a user network connected through a gateway of the user network to a primary network to a service provider, according to an exemplary embodiment of the invention.

The present invention will be described herein in the context of illustrative embodiments of managing quality of service of computing resources. It is to be appreciated, however, that the techniques of the present invention are not limited to the specific apparatus, systems and method shown and described herein. Rather, embodiments of the invention are directed broadly to improved techniques for problem detection and/or resolution in networks and attached devices. For this reason, numerous modifications can be made to these embodiments and the results will still be within the scope of the invention. No limitations with respect to the specific embodiments described herein are intended or should be inferred.

A management module comprises information pertaining to a corresponding network attached device, for example, information pertaining to the operation, configuration and interface of the network attached device. A management module may, for example, assist in revealing to the user, or to a client of the user, where a problem may reside shall a problem arise. A management module may, for example, contribute to mapping a network of a user by, for example, indicating devices connected to the user network (network attached devices), indicating the type of the network attached devices, and indicating the status of links between the network attached devices and a gateway and other user devices such as, but not limited to, digital displays. In addition to indicating devices connected to the user network and status of the links between the network attached devices, a management module may also be used for monitoring the operational status and configuration settings of the network attached devices, for example, by implementing a device-specific protocol to communicate with a given network attached device and query/retrieve such information. For example, the management module can be used to retrieve requirements of a network attached device regarding network ports that need to be open in a firewall, or requirements for traffic shaping and bandwidth reservations that a network attached device might need. A management module may further implement interfaces to dynamically change the configuration of the network attached devices, for example, by performing a reboot of the network attached device.

The term quality of service (QoS), as used herein, is the quality of data exchange between two computer resources over a network, for example, data sent and received between a network attached device of the user and another computer resource sending and/or receiving data over the Internet. QoS comprises, for example, metrics or aspects, for transferred packets or data, of a bit rate, a delay, a jitter, a packet dropping probability and a bit error rate. A low QoS may be indicated by, for example, one or more of these metrics falling above or below a specified or predetermined threshold for that metric. Examples are a bit rate below a specified bit rate threshold or a packet delay above a specified delay threshold. Other metrics of QoS are possible, for example, those that describe aspects of quality of application services, such as number of dropped I-frames (intra-coded picture frame) in an MPEG4 (Moving Picture Experts Group 4) video transmission, or number of parallel sessions used for file transfer in peer-to-peer file sharing applications. A low QoS indicates a problem. A problem, for example, comprises a metric or aspect of QoS being above or below the specified threshold.

The term user, as used herein, is a consumer of computing resources, for example, processors, devices, networks, and software. For example, a user may be considered an end user if the user consumes, operates, has control over or owns residential or SMB computing resources. Other end users are contemplated that consume, operate, have control over or own other computing resources. The user may be, for example, a customer of a service provider such as an ISP.

The term device, as used herein, is a computing device of a user, for example, an end user. By way of example only, a device may be a processor, a laptop, a personal digital assistant (PDA), a gaming console, a printer, a scanner, a music player, a video player, a telephone such as a cell phone, a data storage device such as a disk or integrated circuit memory, a television, or an entertainment system. For example, a device may be attached to a network, for example, a wireless network, a wired network, an Ethernet network, or a local area network (LAN). A device coupled to a network of a user is termed herein as a network attached device.

The term gateway, as used herein, is an interface computing resource, for example, one or more processors, devices and software, that assists, allows or controls access from a source/destination computing resource to another source/destination computing resource. For example, a gateway may couple the Internet to a wireless network of a user. For additional examples, a gateway may comprise a wireless router, a fiber-optic modem, a cable modem or a digital subscriber line (DSL) modem. A gateway commonly, but not always, comprises one or more integrated circuits such as a network processor.

The term user network, as used herein, is a network under the control of, operated by, used by, or owned by a user. For example, a user network is a residential or SMB network, such as a wireless network, connected to a gateway for connection to a primary network, such as the Internet. A primary network is a network apart from the user network and typically coupled to the user network through a gateway including but not limited to a modem.

The term trouble call, as used herein, is a contact from a user to a service provider reporting a problem. The user may be requesting assistance on resolving the problem. The contact may be, for example, a phone call, email, text message or other mode of contact.

Aspects of the invention include innovations that allow users, for example, users that are customers of an ISP, to self-diagnose the root cause of problems, for example, performance problems such as low performance, low speed of information transfer, device malfunction, software problems and user problems. The ISP would then only get a trouble call if the problem actually lies in a network or resource of the ISP, and not for device hardware or software problem associated with a device or network of the user. Aspects of the invention may optionally address the exact nature of the root cause of problems.

If the location of root cause, and possibly the root cause itself, can be determined and conveyed to the user, and if the root cause lies in a device or network of the user, then the user can resolve the problem, thus saving costs for the service providers by reducing the number of service provider service calls. The challenge is to remotely troubleshoot the location of the root cause of a problem (e.g., performance degradation problem), and the root cause itself, in a diverse set of devices and provide customized feedback to the users.

Advantages of the invention are, for example, identification of the domain of the root cause reducing costs for network service providers, by decreasing the number of service support calls; providing flexibility in managing home devices without increasing management burden for the user, for example, new devices are automatically incorporated into the home management infrastructure; and providing a management hierarchy into the home environment that does not require an operator to enforcing management policies on behalf of end-users by delegation of management functionality and centralizing management and enforcement of user-defined management policies.

FIG. 1 illustrates a provider to user network 100 comprising a user network 110 connected through a gateway of the user network 111 to a primary network 120 to a service provider 130, according to an embodiment of the invention. By way of example only, the primary network 120 may comprise the Internet, a metropolitan area network (MAN) and/or a wide area network (WAN). Technologies used to implement the primary network 120 may comprise, for example, wired, optical, wireless, WiMax, Ethernet, digital subscriber line (DSL), digital, asynchronous transfer mode (ATM), and/or SONET. Although exemplary embodiments of the invention described herein may comprise or couple to the Internet, it is understood that other embodiments of the invention may comprise or couple to other primary networks, examples of which are cited above.

By way of example only, the service provider 130 may comprise an Internet service provider (ISP), a telecommunications company, a satellite communications company, a cable communications company and/or other network service providers. The service provider 130 typically provides the primary network to the user network, for examples, DSL, cable, fiber optic or satellite couplings provided to the home or SMB. Also by way of example, the user network 110 may comprise a residential (home) or SMB network, an Ethernet network, a local area network (LAN), an optical network, a wired network and/or a wireless network. The user network 110 may also or instead comprise a MAN, a WAN or a private network such as a virtual private network (VPN). Technologies used to implement the user network 110 may comprise, for example, wired, optical, wireless, WiFi®, WiMax, Ethernet, digital subscriber line (DSL), digital, asynchronous transfer mode (ATM), and/or SONET. The user network 110 may also be known as customer premises comprising customer premises equipment.

The user network 110 comprises a gateway 111 and at least one network attached device such as a personal computer (PC) 113, a laptop or notebook computer 115, a personal digital assistant 116 and 117, a wireless printer 114 or other Internet access device (not shown). The user network 110 may or may not also comprise a wireless access device, modem or port 112. In some embodiments, the gateway 111 comprises the wireless access device 112; in other embodiments, the wireless access device 112 is separate from but coupled to the gateway 111. The user network 110 further comprises a device inventory or registry 119 comprising a list of network attached devices and at least one characteristic or a at least a portion of a signature of each device, for example, a device identifier (ID) (e.g., a unique device identifier), an ID number, a brand, a model, a type of device, a serial number, one or more protocols, one or more technologies, etc. The device inventory 119 is coupled to the gateway 111. The network attached devices are coupled to the gateway 111, for example, coupled by wired connection as shown for PC 113 (although PC 113 could be coupled by wireless connection), or coupled by wireless connection as shown for laptop or notebook computer 115, PDAs 116 and 117 and printer 114. Wireless connections and wireless access device 112 typically use 802.11 wireless LAN (WLAN) standards; however, other types of wireless coupling are contemplated, for example, Bluetooth®, optical, wireless cell phone technologies (e.g., 2G, 2.5G and 3G), satellite wireless, and private radio. Wired connections typically use Ethernet or are through universal serial ports (USB), although other types of wired connections are contemplated.

An embodiment of the present invention, at a high level, is a three step process to achieve the goal of managing user network devices in the user environment (e.g., residential or SMB) centering on a gateway (e.g., wireless router and/or Internet gateway) that acts as the central point through which connectivity is provided from a primary network (e.g., the Internet) to the user network and, consequently, to the rest of the devices coupled to the user network. The high-level three steps of the process are: (i) identification of user devices on the user network, (ii) on-demand downloading and installation of management modules in the gateway for each device that has been identified and (iii) determining, for example, with high probability, and revealing to the user the domain in which the root cause of a problem most likely or actually resides and/or the root cause of the problem.

An embodiment of the invention is a network management system comprising the high-level three step process and is executed on the computing resources of the user, for example, the gateway or a dedicated core of a processor (e.g., a dedicated core of a multicore processor), a virtual machine or other processor. Execution on a dedicated core of a processor or a virtual machine increases reliability and isolation from other services provided by the gateway. Although specific exemplary embodiments of the invention described herein comprise the gateway as the computing resource that executes at least a part of the process of the network management system of the invention, it is understood that other computing resources may instead or in addition execute steps of the process, for example, the above mentioned dedicated processor, virtual machine other processor.

The gateway acts as the central hub where management modules are deployed by automatic identification and downloading of management modules, for each device, to the gateway. The gateway also provides a robust management solution in that, for example, the device management modules always remain active, may execute on a dedicated core of a multicore processor or on a virtual machine, and are safe from being abruptly terminated.

A first exemplary advantage over currently known solutions is that the management burden to the user is minimized, for example, a priori knowledge of the management interfaces of each device is not assumed or required. The user does not need to learn how to interact with each device in advance. A second exemplary advantage is that the system allows for specification and enforcement of network-wide policies for the user environment, while automating the task of enforcement of these policies for one or more devices.

Referring back to the three high-level steps of the high-level process, in an embodiment of the present invention, the first high-level step comprises automatic identification of the network attached devices. Advantageously, automatic identification avoids having users manually update and specify, in the network management system, details of the network attached devices, for example, brand, model, type, etc. Instead, the gateway automatically infers the type of networking device that attempts to connect to the Internet, by using probing and/or packet inspection. For example, probing that identifies the open ports of the wireless device and/or the operating system (OS) type, and packet inspection (e.g., deep packet inspection) that extracts information from the contents of packets that the gateway transmits. The extracted information is, for example, information regarding the type, model, characteristics and capabilities of the device.

The second high-level step comprises automatic downloading of management modules to the gateway that is within and coupled to the user network, from a remote management server, in an on-demand fashion, providing comprehensive management services locally from the gateway to each of the network attached devices. The second high-level step takes into account user-wide network management policies. As the number of all possible user devices is very large, due to memory and storage capacity constraints it would be impractical to have pre-loaded management functionality onto the gateway for each one of all possible user devices. Moreover, as new user devices are continuously introduced into the market, such a repository of management modules for each of these devices would have to be continuously updated. An on-demand approach to downloading and executing user device management functionality encapsulated into management modules and using a standardized interface is beneficial for such a dynamic and continuously evolving environment.

The third high-level step comprises revealing to the user where a detected problem resides, and possibly revealing to the user the root cause of the problem, at least partially enabling the user to fix a problem without having to contact the service provider that either directly or indirectly supports the device in question.

Combining the above three high-level steps together provides for a network management solution that exhibits the following advantages. First, the management system becomes more responsive to the continuously changing networking environment. As new consumer/business electronic devices are introduced and adopted into the home or SMB environment, the end-device management system is able to incorporate the new devices into the infrastructure of the home or SMB environment. Second, a management hierarchy is implicitly formed, which frees the network operator or the service provider from the task of enforcing user-wide policies on behalf of the end-users that specified the policies. Instead, the gateway acts as a first-level management hub for the user networking environment and is controlled by the user. Third, the network management solution lifts the management burden from the end-user, because it requires minimal or no user intervention by automating both the identification and the configuration parts of the network attached devices that are managed. Fourth, the network management solution lowers the cost of management for the operator/service provider, as the network management solution partially delegates the task onto a device (e.g. a gateway) that is typically owned or operated by the user. Aspects of the invention provides a network management solution not requiring manual setting up and configuring each network attached device or having individual service providers separately configuring these devices.

Figure 2:
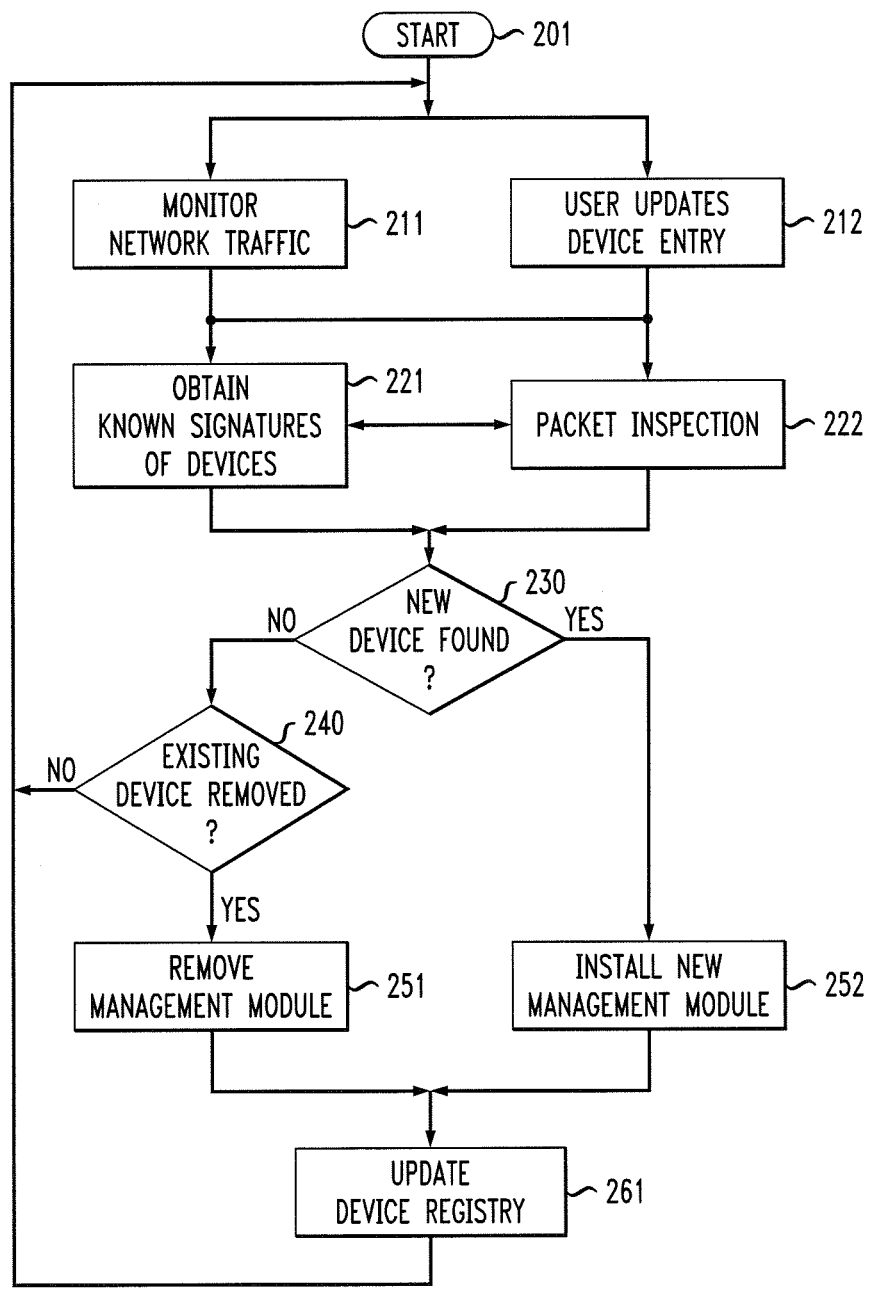
FIG. 2 is a flow chart of a method for identification of user devices on a user network, according to an exemplary embodiment of the invention.

FIG. 2 is a flow chart of a method for identification of user devices on a user network, according to an embodiment of the invention. The method starts at start block 201. The method proceeds to monitor network traffic at monitor network traffic block 211. Network traffic, for example, flows between the primary network (e.g., the Internet) and the network attached devices through the gateway 111. In a specific embodiment, the gateway 111 is the device that monitors the traffic. The method may also obtain information from the user regarding a change in device status for a network attached device at user update block 212. The change in device status may be, for example, the connection or disconnection of a network attached device.

As a consequence of or during monitoring of the network traffic (monitor network traffic block 211), as a consequence of obtaining user updates (user update block 212) or otherwise initiated, the method obtains signatures of the devices attached to the network (i.e., the network attached devices) at obtain signatures block 221. As previously mentioned, the signatures of the network attached device comprise, for example, a device identifier (ID), an ID number, a brand, a model, a type of device, a serial number, one or more associated protocols or one or more associated technologies. The signature for each network attached device is unique, at least among devices on the user network; for example, the signature comprises a unique ID. In an embodiment, the gateway 111 detects the signatures.

One method of detecting the signatures, or a portion thereof, is by probing of a device to identify open ports of the device (e.g., open network ports of a wireless device) and to identify the OS type. The probing may comprise, for example, communicating with a device and opening the network port at the device and obtaining information (e.g., strings) that are provided upon the establishment of a connection, such information comprising one or more components of a signature for that device. The probing may, for example, identify a protocol that is used for traffic transmitted by the device.

An additional method for determining at least part of a signature of a device comprises identifying the device iteratively, by a sequence of downloads of management modules that progressively refine the identification process of the device. For example, a first management module may be downloaded to identify the brand of a device (brand identification). Based on the results of the brand identification of the device, an appropriate second management module is selected and downloaded from the management module repositories, and used to identify the type of the device (type identification). Based on the results of the type identification, a third management module is similarly selected, downloaded and used for further refining the identification of the device by inferring its model. This example process can proceed iteratively in several steps, until an identifier that uniquely identifies the device, such as, but not limited to, a serial number, can be determined.

The method, at inspection block 222, may examine packets of network traffic received or transmitted by the gateway (e.g., deep packet inspection), to detect the signatures, or portions thereof, of devices. For example, the gateway 111 may examine packets transmitted by the device. The packet examination may extract from the packets, for example, information about the type, model, protocol, characteristics and capabilities of the device. In an embodiment, the packets are stored in memory of the gateway and different portions of the packet are analyzed to extract the information. Packet examination may, for example, identify a protocol that is used for traffic transmitted by the device, identify the remote network servers the devices attempts to communicate with once initial connectivity to the Internet has been established through the gateway, and/or identifying all or a portion of a signature for a network attached device.

Embodiments of the invention determine a unique identifier of the device by transmitting signature related information (e.g., a portion of a signature), protocol characterises and/or other information obtained through monitoring network traffic, user updates, probing, or packet inspection to a remote management server that attempts to match the information to information within a database of known device identifiers, and provides the information to the gateway.

In order to determine if a new device has been attached or coupled to the user network, the method compares the detected signatures to signatures of devices previously known to have already been attached or coupled to the network. If no new device are found, the method, at new device found decision block 230, proceeds to determine if a previously attached device has been removed from the network at device removed decision block 240. If no device has been found to have been removed from the network, the method returns to the start block 201 for another iteration through the above described steps or blocks of the method.

If it is found, at the device removed decision block 240, that a device has been removed from the network, the method, at the remove management module block 251, removes the management module for the removed device from the gateway and, at update registry block 261, the method updates a device registry of network attached devices by removing the entry corresponding to the device that has been removed.

If at the new device found decision block 230, it is found that a new device has been added to the network, a device management module for the new device is obtained and installed, at install management module block 252, and the registry is updated, at update registry block 261, to add an entry for the new device that has been attached to the network. After registry update to add or remove a network attached device, the method returns to the start block 201 and may again iterate through the steps or blocks of the method.

In that portion of the method associated with the install management module block 252, in one embodiment of the invention, the gateway obtains, over the primary network from one or more repositories of one or more remote servers, a catalogue of servers providing management information and/or modules for the newly found network attached device. From the one or more servers, the gateway obtains the management information and/or modules. The management information and/or modules provide for managing the operation of the newly found network attached device. In an alternate embodiment, instead of or in addition to repositories obtained over the primary network, the gateway itself comprises or stores one or more repositories.

Figure 3:
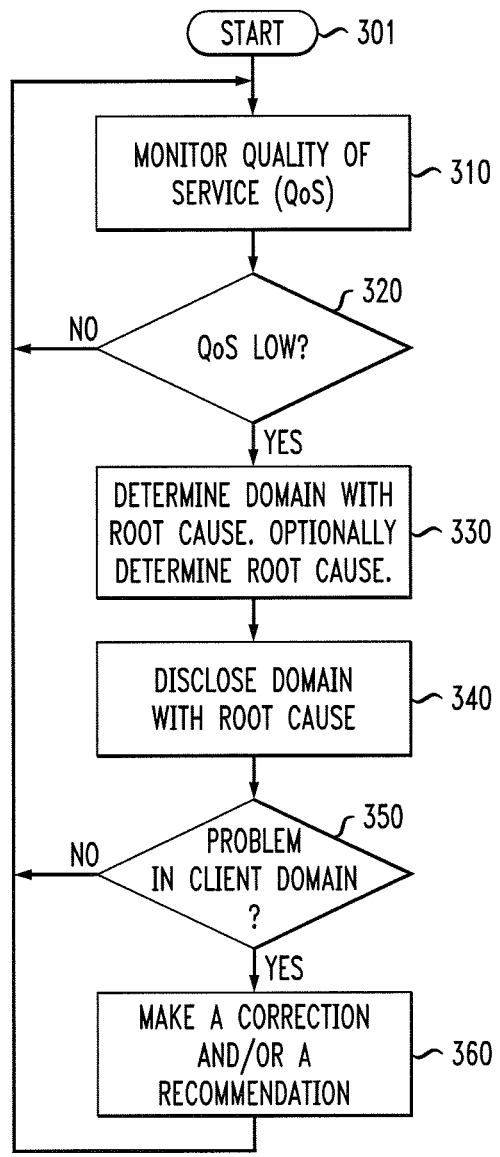
FIG. 3 is a flow diagram of a method for detecting and locating a problem in computing resources, according to an exemplary embodiment of the invention.

FIG. 3 is a flow diagram of a method for detecting and locating a problem in computing resources, according to an embodiment of the invention. The method starts at start block 301 and proceeds, at monitor QoS block 310, to monitor the quality of service (QoS). The QoS may be monitored for the entire provider to user network (e.g., provider to user network 100) or for the user network (e.g., user network 110) including any network attached devices (e.g., devices 113-117), wired links (e.g., wired link 445 of FIG. 4), wireless links (e.g., wireless links 443 and 444 off FIG. 4) and optical links within the user network. The QoS may be monitored by any number of ways known in the art. The QoS may be monitored by, for example, the gateway using the management information and/or modules, obtained in that portion of the method associated with the install management module block 252, to monitor the network attached devices for QoS.

If, at the QoS low decision block 320, the monitored QoS is found to be low, that is, there is a problem with the quality of service, the method proceed to determine, at the determine domain block 330 the domain of the root cause and, optionally, the root cause of the low QoS or the related problem. At the disclose domain block 340, the method discloses to the user the domain of the root cause and, optionally the root cause. By way of example only, the gateway determines the domain of the root cause and/or the root cause.

In one embodiment, the domain with root cause, and, optionally, the root cause, is determined by the gateway using the management information and/or modules, obtained in that portion of the method associated with the install management module block 252. In another embodiment, the domain with root cause, and, optionally, the root cause, is determined by the gateway using information obtained from monitoring the QoS (monitor QoS block 310). In yet another embodiment, the domain with root cause, and, optionally, the root cause, is determined by the gateway using at least a portion of the information contained in the signatures of the network attached devices.

If, at the problem in client domain decision block 350, the root cause of the problem or low QoS has been found to be in the client domain, the method, at correction block 360, makes a correction to improve the QoS or to mitigate the problem. Alternately or additionally, the method, at correction block 360 provides information to the user regarding correction of the problem. The information may comprise, for example, recommendations or information on how to resolve the problem or raise the QoS, or information pertaining to the already completed resolution of the problem or improvement in the QoS. Using this information, the problem may be corrected by the user. After a correction/improvement is made or the information is provided to the user the method returns to the start block 301 and may again iterate through the steps or blocks of the method.

If at the QoS low decision block 320, it was determined that the QoS was not low and if no problem was detected the method returns to the start block 301. If at the problem in client domain decision block 350, it was determined that the problem was not in the client domain, the method returns to the start block 301. After returning to the start block 301, the steps of the method may be again executed. In any case where there is a problem, the user is informed of the domain or location of the problem, for example, the user network 110, outside of the user network 110, the primary network 120, a particular link of the user network, or a particular networked attached device.

The blocks of FIGS. 2 and 3 can be mapped to the high-level three steps described above regarding the high-level description of an embodiment of the invention. The first high-level step (i), identification of user devices on the user network, comprises the monitor network traffic block 211, the user update device block 212, the obtain signatures block 221, the inspection block 222, the new device found decision block 230, and the existing device removed decision block 240. The second high-level step (ii), on-demand downloading and installation of management modules in the gateway for each device that has been identified, comprises the install management module block 252, the remove management module block 251, and the update registry block 261. The third high-level step (iii), determining and revealing to the user the domain in which the root cause of a problem most likely or actually resides and/or the root cause of the problem, comprises at least the determining domain block 330 and the disclose domain block 340 of FIG. 3. Additionally, the third high-level step may also comprise one or more of the monitor QoS block 310, the QoS low decision block 320, the problem in client domain decision block 350 and the correction block 360.

In a certain embodiment of the invention, the method for identification of user devices on a user network illustrated in FIG. 2 may occur simultaneously with the method for detecting and locating a problem in computing resources illustrated in FIG. 3. One or each of the methods may execute continuously, that is, when one iteration through the steps of the method is completed, another iteration commences. Alternately, one or both of the methods may occur only periodically, for example once every specified time period or when instructed to do so by the user or the service provider.

It is understood that the blocks of FIGS. 2 and 3 and the functions thereof may be implemented in modules, the modules corresponding to the blocks themselves, portion of blocks or combinations of the blocks or portions thereof. The modules comprise, for example, software and/or hardware adapted to enable the function of the modules.

Figure 4:
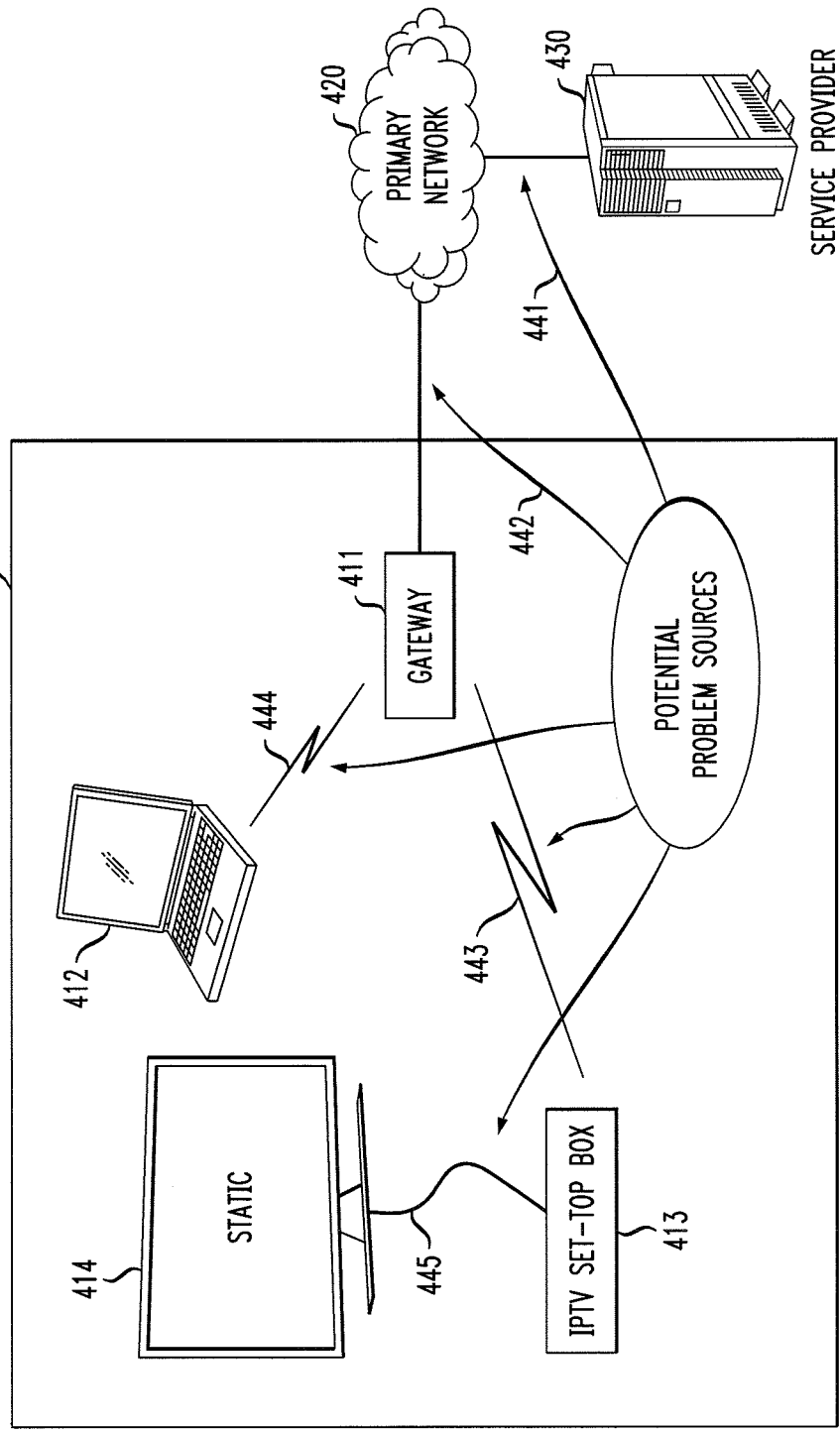
FIG. 4 shows a provider to user network comprising a user network, including an Internet protocol television, connected through a gateway of the user network to the Internet (primary network) than to an Internet service provider, and illustrates application of methods of the invention to an exemplary problem of static on a monitor of the Internet protocol television, according to an exemplary embodiment of the invention.

Aspects of the invention becomes increasingly important as more devices that facilitate electronic media sharing (e.g., video and audio sharing) populate customer premises. For example, FIG. 4 illustrates application of methods of the invention to an exemplary problem of static on a monitor of an Internet protocol television (IPTV). FIG. 4 shows a provider to user network 400 comprising a user network 410 connected through a gateway of the user network 411 to a primary network 420 (e.g., the Internet) to a service provider 430 (e.g. ISP), according to an embodiment of the invention. The user network comprises the gateway 411 comprising a wireless device providing wireless connections to laptop computer 412 and IPTV set-top box 413. The IPTV set-top box 413 is coupled to monitor 414. The user network 410 further comprises various network connections or couplings: a gateway to laptop wireless link 444, a gateway to IPTV set-top box wireless link 443, and an IPTV set-top box to monitor wired link 445. The provider to user network 400 further comprises a service provider to primary network link 441 and a primary network to user network link 442 which couples to the gateway 411.

The IPTV set-top box 413 wirelessly receives video from the gateway 411 over gateway to IPTV the set-top box wireless link 443 and displays the video on a monitor via the IPTV set-top box to monitor wired link 445. Bad video quality (e.g., static) may result from a problem in the IPTV service (for example, the service provider to primary network link 441 and the primary network to user network link 442), the gateway to IPTV set-top box wireless link 443, or the IPTV set-top box to monitor wired link 445. The gateway uses management modules for the IPTV set-top box 413 and/or monitor 414 to detect, with high accuracy, where the problem lies and reports the location of the problem to the user via a web page which is hosted on the gateway or on a physical display which is coupled to the gateway, for example a liquid crystal (LCD) display. The role of the management module is important because management module allows end-to-end fault detection without requiring the service provider to fully penetrate the user domain.

Techniques of the invention, for example as depicted in FIGS. 1-4, can also include, as described herein, providing a system, wherein the system includes distinct software modules, each of the distinct software modules being embodied on a tangible computer-readable recordable storage medium. By way of example only, the software modules may include: an identification module adapted to identify devices of a user on a network of the user; a procurement module adapted to obtain management modules for the identified devices; an installation module adapted to install the management modules in a processor; a monitor module adapted to monitor the devices of the user for a problem; and a determination module adapted to determine a domain in which a root cause of the problem resides, and/or the root cause of the problem. As a further example, the software modules may include functions shown in the blocks of FIGS. 2 and 3, the modules corresponding to the blocks themselves, portion of blocks or combinations of the blocks or portions thereof.

Additionally, the techniques, for example as depicted in FIGS. 1-4, can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 5:
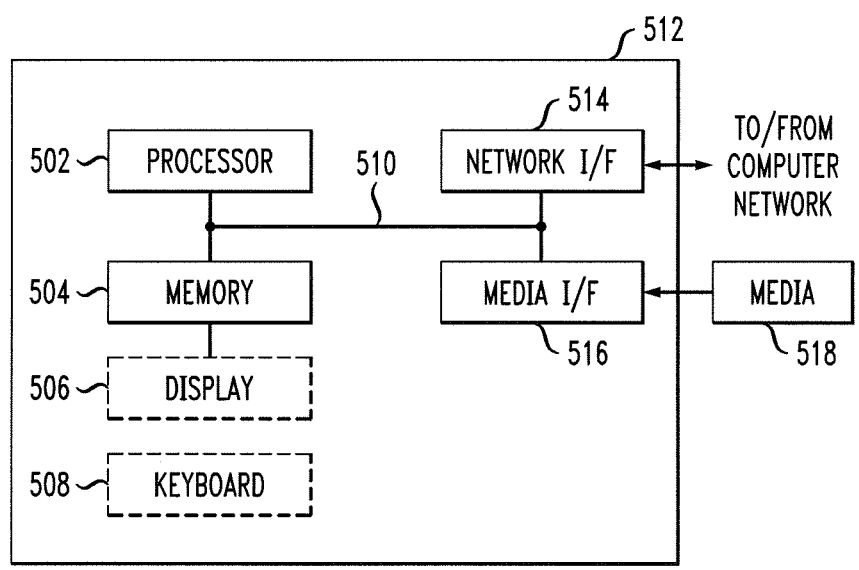
FIG. 5 depicts a computer system that may be useful in implementing one or more aspects and/or elements of the invention.

One or more embodiments can make use of software running on a general purpose computer or workstation. With reference to FIG. 5, such an implementation employs, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 504), magnetic tape, a removable computer diskette (for example media 518), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code can include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 508, display 506, pointing device, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIGS. 2 and 3. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, one or more integrated circuits, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, creating highly optimized applications that are tailored to the underlying computing and networking infrastructure.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, implemented on a processor of an end user device, for managing quality of service of computing resources in an end user network, wherein the method steps are implemented by the processor of the end user device, the method comprising the steps of:

automatically identifying, by a processor of an end user device, one or more end user devices of a user that are present on an end user network of the user;

automatically obtaining, by the processor, at least one management module for each identified end user device, wherein a management module for a given end user device comprises information for automatically managing the given end user device in the end user network, wherein the information for automatically managing the given end user device comprises information for operating and configuring the given end user device and for interfacing with the given end user device;

installing the at least one management module for each identified end user device in the processor;

monitoring, by the processor, the one or more end user devices of the user for a problem using information from one or more installed management modules;

determining, by the processor, a domain in which a root cause of the problem resides, wherein the domain is a user domain or a service provider domain; and determining, by the processor, the root cause of the problem.

2. The method of claim 1 further comprising the step of:
disclosing to the user at least one of: (i) the determined domain, and (ii) the determined root cause.

3. The method of claim 1, wherein the step of identifying the one or more devices comprises determining a signature for each device of the one or more devices, wherein the signature for each device of the one or more devices comprises at least one of: (i) a unique device identifier, (ii) an identification number, (iii) a brand, (iv) a model, (v) a type of device, (vi) a serial number, (vii) one or more protocols of the each device, and (viii) one or more technologies of the each device, and wherein each of the one or more devices is uniquely identified, at least within the one or more devices of the user, by the signature.

4. The method of claim 3, wherein the step of identifying the one or more devices comprises establishing a connection by opening a network port of the one or more devices and obtaining information that is provided upon the establishment of the connection, and wherein at least one of the signatures comprises the obtained information.

5. The method of claim 1, Wherein the step of identifying the one or more devices comprises examination of network traffic transmitted by the one or more devices.

6. The method of claim 5, wherein the examination of network traffic comprises at least one of: (i) identifying one or more protocols that are used for the network traffic transmitted by the one or more devices, (ii) identifying one or more remote servers the one or more devices attempt to communicate with once initial connectivity to a network outside of the user network has been established by the one or more devices, and (iii) identifying a portion of one or more signatures for the one or more devices, and wherein each of the one or more signatures comprises at least one of: (i) a unique device identifier, (ii) an identification number, (iii) a brand, (iv) a model, (v) a type of device, (vi) a serial number, (vii) one or more protocols, and (viii) one or more technologies.

7. The method of claim 3, wherein for a device of the one or more devices, the unique device identifier is determined by transmitting to a remote server at least one of: (i) a portion of a signature for the device, (ii) a protocol characteristic of the device, and (iii) information obtained by examination of network traffic from the device, and wherein the remote server is adapted to provide device identifiers.

8. The method of claim 1, wherein a gateway of the network of the user comprises the processor.

9. The method of claim 3, wherein the step of identifying the one or more devices identifies a newly coupled device, newly coupled to the network of the user, by comparing a newly determined signature of the newly coupled device to signatures of one or more devices previously known to currently be coupled to the network of the user;

wherein the steps of obtaining and installing obtain and install a management module for the newly coupled device;

wherein the step of installing comprises updating a device registry comprising a list of entries for the one or more devices, each entry comprising at least a portion of the signature for the associated one of the one or more devices; and wherein the updating of the registry adds an entry for the newly coupled device to the device registry.

10. The method of claim 9 further comprising the step of:
removing a management module from the processor;

wherein the step of identifying the one or more devices identifies a previously coupled device, no longer coupled to the network of the user, by comparing current signatures of the currently coupled device to signatures of one or more devices previously known to have been coupled to the network of the user;

wherein the management module for the previously coupled device is removed; and wherein an entry for the previously coupled device is removed from the device registry.

11. The method of claim 1, wherein the step of obtaining the at least one management module for each identified device comprises the steps of:

obtaining from one or more repositories a list of servers having the at least one management module; and obtaining the at least one management module from at least one server from the list of servers;

wherein at least one of (i) a remote server coupled to the network of the user, and (ii) the processor comprises one of the one or more repositories.

12. The method of claim 1, wherein the step of monitoring comprises at least one of (i) monitoring quality of service of the at least one of the one or more devices, (ii) monitoring the quality of service of the network of the user, and (iii) monitoring using at least one of the at least one management module; and wherein the problem comprises an aspect of the quality of service being at least one of: (i) above a high-limit predetermined threshold, and (ii) below a low-limit predetermined threshold.

13. The method of claim 3, wherein the step of determining at least one of the domain and the root cause uses at least one of: (i) at least a portion of the information contained in one or more of the signatures of the one or more devices, and (ii) at least a portion of the information contained in the at least one management module.

14. The method of claim 1, wherein the step determining at least one of the domain and the root cause are adapted to provide information to the user, at least partially enabling the user to resolve the problem.

15. A system for managing quality of service of computing resources in an end user network, the system comprising:

an identification module, executed by a processor, operative to automatically identify one or more end user devices of a user, which are present on an end user network of the user;

a procurement module, executed by a processor, operative to obtain at least one management module for each identified device, wherein a management module for a given end user device comprises information for automatically managing the given end user device in the network, wherein the information for automatically managing the given end user device comprises information for operating and configuring the given end user device and for interfacing with the given end user device;

an installation module, executed by a processor, operative to install the at least one management module for each identified end user device in a processor;

a monitor module, executed by a processor, operative to monitor the one or more end user devices of the user for a problem using information from one or more installed management modules; and a determination module, executed by a processor, operative to determine a domain in which a root cause of the problem resides, wherein the domain is a user domain or a service provider domain and to determine the root cause of the problem.

16. The system of claim 15, wherein the identification module is adapted to identify a newly coupled device, newly coupled to the network of the user, by comparing a newly determined signature of the newly coupled device to signatures of one or more devices previously known to currently be coupled to the network of the user;

wherein the procurement and installation modules are adapted to obtain and install a management module for the newly coupled device;

wherein the installation module is adapted to update a device registry comprising a list of entries for the one or more devices, each entry comprising at least a portion of the signature for the associated one of the one or more devices; and wherein the updating of the registry adds an entry for the newly coupled device to the device registry.

17. The system of claim 16 further comprising:

a removal module adapted to remove a management module from the processor; and a disclose module adapted to disclose to the user at least one of: (i) the determined domain, and (ii) the determined root cause;

wherein the identification module is adapted to identify a previously coupled device, no longer coupled to the network of the user, by comparing current signatures of the currently coupled device to signatures of one or more devices previously known to have been coupled to the network of the user;

wherein the management module for the previously coupled device is removed; and wherein an entry for the previously coupled device is removed from the device registry.

18. The system of claim 15, wherein the identification module is adapted to determine a signature for each device of the one or more devices, wherein the signature for each device of the one or more devices comprises at least one of: (i) a unique device identifier, (ii) an identification number, (iii) a brand, (iv) a model, (v) a type of device, (vi) a serial number, (vii) one or more protocols of the each device, and (viii) one or more technologies of the each device, and wherein each of the one or more devices is uniquely identified, at least within the one or more devices of the user, by the signature.

19. The system of claim 18, wherein the identification module is adapted to at least one of: (i) establish a connection by opening a network port of the one or more devices and obtaining information that is provided upon the establishment of the connection, and wherein at least one of the signatures comprises the obtained information, and (ii) examine network traffic transmitted by the one or more devices.

20. The system of claim 19, wherein the examination of network traffic comprises at least one of: (i) identifying one or more protocols that are used for the network traffic transmitted by the one or more devices, (ii) identifying one or more remote servers the one or more devices attempt to communicate with once initial connectivity to a network outside of the user network has been established by the one or more devices, and (iii) identifying a portion of one or more signatures for the one or more devices.

21. Apparatus for managing quality of service of computing resources, the apparatus comprising:

a memory; and a processor coupled to the memory, operative to:

automatically identify one or more end user devices of a user, which are present on an end user network of the user;

automatically obtain at least one management module for each identified end user device, wherein a management module for a given end user device comprises information for automatically managing the given end user device in the end user network, wherein the information for automatically managing the given end user device comprises information for operating and configuring the given end user device and for interfacing with the given end user device;

install the at least one management module for each identified end user device in the processor;

monitor the one or more end user devices of the user for a problem using information from one or more installed management modules;

determine a domain in which a. root cause of the problem resides, wherein the domain is a user domain or to service provider domain; and determine the root cause of the problem.

22. The apparatus of claim 21, wherein a gateway of the network of the user comprises the processor.

23. The apparatus of claim 21 further comprising:

a device inventory comprising a list of the one or more devices and at least a portion of a signature for each device of the one or more devices;

wherein the signature for each device comprises at least one of: (i) a unique device identifier, (ii) an identification number, (iii) a brand, (iv) a model, (v) a type of device, (vi) a serial number, (vii) one or more protocols of the each device, and (viii) one or more technologies of the each device, and wherein each of the one or more devices is uniquely identified, at least within the one or more devices of the user, by the signature.

24. An article of manufacture for managing quality of service of computing resources, wherein the article comprising, a computer readable storage medium having one or more programs embodied therewith, wherein the one or more programs, when executed by a computer, perform steps of:

automatically identifying, by a processor of an end user device, one or more end user devices of a user that are present on an end user network of the user;

automatically obtaining, by the processor, at least one management module for each identified end user device, wherein a management module for a given end user device comprises information for automatically managing the given end user device in the end user network, wherein the information for automatically managing the given end user device comprises information for operating and configuring the given end user device and for interfacing with the given end user device;

installing the at least one management module for each identified end user device in the processor;
monitoring, by the processor, the one or more end user devices of the user for a problem using information from one or more installed management modules;
determining, by the processor, a domain in which a root cause of the problem resides, wherein the domain is a user domain or a service provider domain; and
determining, by the processor, the root cause of the problem.

* * * * *